United States Patent [19]

Saito

[11] Patent Number: 5,058,245
[45] Date of Patent: Oct. 22, 1991

[54] FASTENING DEVICE AND METHOD FOR FIXING ADHEREND BY USING THE SAME

[75] Inventor: Sanpei Saito, Tokyo, Japan

[73] Assignee: Kuraray Co., Ltd., Kurashiki, Japan

[21] Appl. No.: 429,456

[22] Filed: Oct. 31, 1989

[51] Int. Cl.⁵ .............................................. A44B 18/00
[52] U.S. Cl. ........................................... 24/306; 24/442
[58] Field of Search ................. 248/205.2; 2/DIG. 6; 24/306, 442, 677, 628, 452; 428/100

[56] References Cited

U.S. PATENT DOCUMENTS

| | | | |
|---|---|---|---|
| 2,704,680 | 3/1955 | Bedford, Jr. | 24/628 X |
| 2,967,324 | 1/1961 | Gagnier | 24/628 X |
| 3,176,364 | 4/1965 | Dritz | 24/306 X |
| 3,464,094 | 9/1969 | Mates | 428/100 X |
| 3,916,703 | 11/1975 | Ribich et al. | 24/306 |
| 4,426,816 | 1/1984 | Dean et al. | 428/100 X |
| 4,687,164 | 8/1987 | Bakhaus et al. | 24/628 X |
| 4,732,631 | 3/1988 | Shimizu | 24/442 X |
| 4,870,725 | 10/1989 | Dubowik | 24/442 |

Primary Examiner—James R. Brittain
Attorney, Agent, or Firm—Oblon, Spivak, McClelland, Maier & Neustadt

[57] ABSTRACT

Provided is a fastening device comprising a plate-shaped article having one component of the loop and hook fastener and a protecting member provided on the same surface of the plate-shaped article where the fastener component is provided, the protecting member having a larger height than that of the fastener component and being capable of deforming when pressed. The fastening device, when attached to a base, leads to easy postioning of various adherends to be fixed thereon, and thus to simplification of execution and reduction of labor.

5 Claims, 5 Drawing Sheets

FASTENING DEVICE AND METHOD FOR FIXING ADHEREND BY USING THE SAME

BACKGROUND OF THE INVENTION

1. Field of the invention

The present invention relates to a fastening device utilizing a separable hook and loop type fastener, which device can fix various items surely on a predetermined position on the surface of a base and the method of fixing various items by using the same.

2. Description of the prior art

The hook and loop type fasteners, which term herein includes so-called mushroom and mushroom type fastener, have been in wide use for joining various items such as textile fabrics (hereinafter referred to as "adherends"). At home, paintings, mirrors and like items are sometimes mounted, as adherends, on such bases as the tile, glass and wall. General procedure in such use is as follows: a fastener strip with one component (for example, loops) of the loop and hook fastener, the back side of which strip is applied with an adhesive, is adhered to the back side of an adherend, a second fastener strip with the other fastener component is adhered to the surface of a base, and the adherend is then fixed on the base by engagement of the two fastener components. In the industrial fields, it has recently been proposed that shaped articles be mounted on the bottom side of the roof panel of an automobile by using the loop and hook fastener (see Japanese Patent Application Laid-open No. 177744/1983). It has also been proposed to use the loop and hook fastener for mounting ceiling materials, floor materials, wall materials and the like in houses or buildings.

In all of the above uses, each component of the loop and hook fastener is adhered on the surfaces of a base and an adherend. Therefore, when one attempts to mount the adherend on a predetermined position on the surface of the base, he must repeat the laborious job of engagement and disengagement of the fastener components before he finally brings and fixes the adherent onto the right position. In particular, it has been very difficult to surely mount and fix complex-shaped articles such as shaped ceilings to be mounted on the roof panels of automobiles or large and heavy shaped articles such as ceiling materials and floor materials, which tend to delicately shift off the right position. Such problem has been impairing the advantages of using the loop and hook fasteners, i.e. simplification of execution and reduction of labor, etc.

Accordingly, an object of the present invention is to provide a fastening device utilizing the separable loop and hook fastener which can readily and surely fix an adherend on the predetermined position of a base without requiring laborious repetition of engagement and disengagement of the fastener components.

Another object of the present invention is to provide a fastening device which can surely and easily fix and adherend on a base without using pegs, rivets or the like, and, if necessary, later replace the adherend easily.

Still another object of the present invention is to provide a method for fixing an adherend on the surface of a base by using the above-described fastening device.

SUMMARY OF THE INVENTION

The present invention provides a fastening device for surely fixing an adherend mounted with one component of the loop and hook fastener on a predetermined position on the surface of a base, which device comprises:

(1) a plate-shaped article or flat member having on one surface thereof the other component of the loop and hook fastener which will engage with the fastener component mounted on the adherend;

(2) a protecting member provided on the same surface having the fastener component of the plate-shaped article, said member having a height larger than that of the fastener component provided on the plate-shaped article so that it can, when the fastener component provided on the plate-shaped article is faced with the other component mounted on the adherend, keep the two fastener components in spaced relationship with each other and being capable of, when the adherend is then pressed against the plate-shaped article, deforming flattened so that the two fastener components engage with each other; and (3) a fixing means which fixes the plate-shaped article on the surface of the base.

The present invention further provides a method for surely fixing an adherend having one component of the loop and hook fastener on a predetermined position on the surface of a base, which comprises the steps of:

(1) fixing on the surface of the base a fastening device comprising: a plate-shaped article having on one surface thereof the other fastener component of the loop and hook fastener which will engage with the fastener component mounted on the adherend; a protecting member provided on the same surface having the fastener component of the plate-shaped article, said member having a larger height than that of the fastener component provided on the plate-shaped article so that it can, when the fastener component provided on the plate-shaped article is faced with the other component mounted on the adherend, keep the two fastener components in spaced relationship with each other and being capable of, when the adherend is then pressed against the plate-shaped article, deforming flattened so that the two fastener components engage with each other; and a fixing means which fixes the plate-shaped article on the surface of the base;

(2) applying the adherend having the one component of the loop and hook fastener to the surface of the base and positioning the adherend there; and (3) pressing the thus positioned adherend against the surface of the base so that the fastener component provided on the fastening device engages with the other fastener component mounted on the adherend.

In the fastening device according to the present invention, the protecting member is provided on the same surface of the plate-shaped article where one component of the loop and hook fastener is provided, and the height of the protecting member is larger than that of the fastener component. When an adherend mounted with the other component of the loop and hook fastener is applied to the fastening device, the protecting member will therefore keep apart the two fastener components and thus protect the adherend from engaging with the surface of the base. Accordingly, one can move the adherend delicately back and forth or left and right to position it surely on a predetermined position while applying it to the fastening device. Then, after positioning the adherend, he can surely fix it by simply pressing it against the fastening device, which pressing deforms the protecting member into a flattened shape so that the fastener component provided on the fastening device engages with the other fastener component mounted on the adherend.

The use of the above-described fastening device leads to simplification of execution and reduction of labor, and makes possible the attachment and replacement of adherends without impairing their appearance by pegging or rivetting.

BRIEF DESCRIPTION OF THE DRAWINGS

FIGS. 6–10 show further examples of the fastening device of the present invention;

DETAILED DESCRIPTION OF THE PREFERRED EMBODIMENTS

Figure 1:
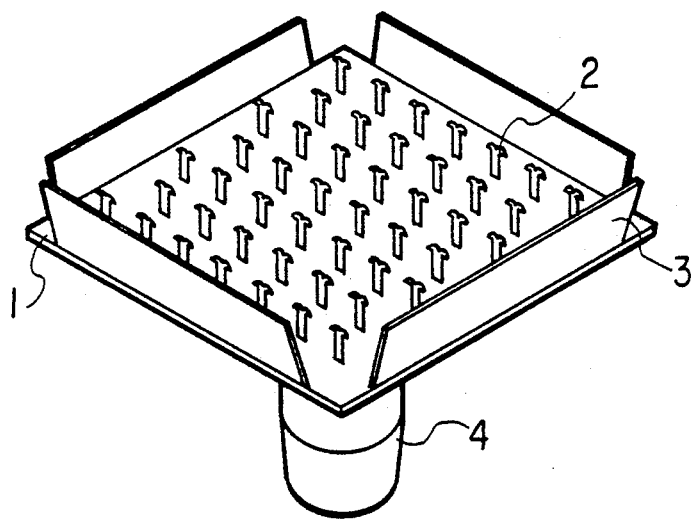
FIG. 1 is a perspective view of an example of the fastening device of the present invention.
Figure 2:
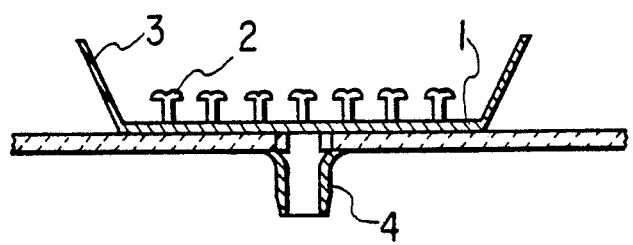
FIG. 2 is a cross-sectional view showing the fastening device shown in FIG. 1 being mounted on a base.

FIG. 1 is a perspective view of an example of the fastening device of the present invention and FIG. 2 is the cross-sectional view of the fastening device shown in FIG. 1.

As shown in FIGS. 1 and 2, the fastening device of the present invention comprises a flat member or plate-shaped article 1 having on one surface thereof a multiplicity of fastening elements 2. On the edges of the surface having the fastening elements of the plate-shaped article, there are provided protecting members 3 which are, in this example, side plates erected upward and outwardly aslant. The protecting members 3 will, when pressd, deform outwardly to decrease their height. The other surface of the plate-shaped article 1 is provided with a fixing means 4 comprising a fixing body for fixing the fastening device on the surface of the base.

Figure 3:
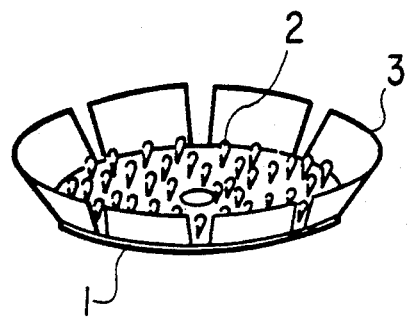
FIG. 3 and FIGS. 6 through 10 are perspective views of other examples of the fastening device of the present invention.

The above-mentioned flat member or plate-shaped article 1 may have any shape such as a square as shown in FIG. 1 or circular as shown in FIG. 3.

Figure 5:
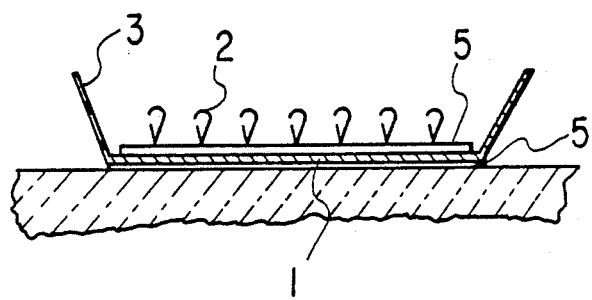
FIG. 5 is a cross-sectional view showing another example of the fastening device of the present invention being mounted on a base.

The fastening elements 2 provided on the plate-shaped article 1 designate either hook-shaped fastening elements or loop-shaped fastening elements, and the hook-shaped fastening elements may have hook-like, mushroom-like, umbrella-like or like shapes. For example, in the case of hook-like fastening elements, the hooks may be prepared by first forming loops of nylon, polyester or optional synthetic monofilament by weaving the monofilament as the auxiliary warp for weaving a base fabric, and then cutting the one side of each of the loops with hair clippers or the like. The basic fabric 5 having the loops uncut is, as shown in FIG. 5, integrally adhered to one surface of the plate-shaped article 1. Or, as shown in FIGS. 1 and 2, the plate-shaped article and the fastening elements 2 may integrally be formed with a plastic, such as nylon and polypropylene, having appropriate elasticity and rigidity.

Figure 6:
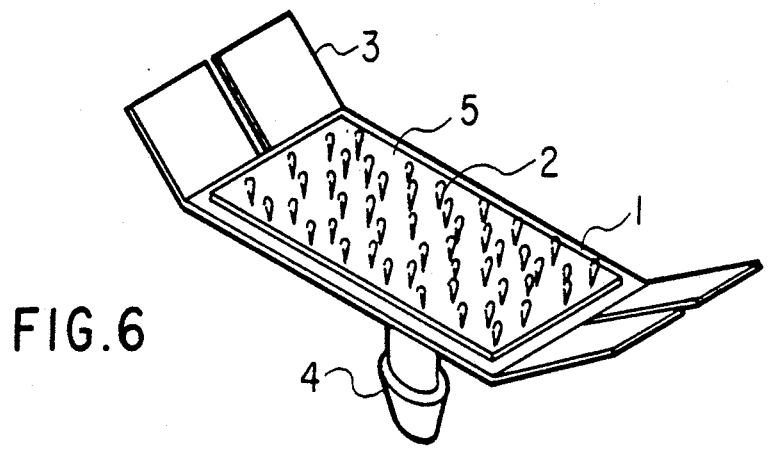

The protecting member 3 has function of keeping the fastening elements 2 provided on the fastening device and the other fastening elements provided on the adherend apart from each other to protect the two fastener components from engaging with each other, and, when pressed, deforms flattened so that the two fastener components join together. The height of the protecting member 3 when unpressed must therefore be larger than that of the fastening elements 2 provided on the plate-shaped article 1. The protecting member generally has a height 0.5 to 5 mm, preferaly 3 mm, larger than that of the fastening elements. Besides, the protecting member must, when pressed, deform to decrease its height down to a height at least 0.5 mm, preferably at least 1 mm smaller than that of the fastening elements. An example of such protecting member is, in the case of the square plate-shaped article 1 shown in FIG. 1, 4 sets of side plates which are erected on 4 sides of the square, the side plates being erected upward and outwardly aslant by an angle of generally 30° to 60°. In this case, instead of 4 sets, a pair of side plates may be provided on the sides opposite to each other. For a thicker side plate which requires a high pressure to deform, splitting it, as shown in FIG. 6, into a plurality of strips spaced apart from one another can lead to easier deformation. In the case of a circular plate-shaped article 1, the side plate may be provided, as shown in FIG. 3, on all the periphery of the plate, and it must be split into a plurality of segments.

Figure 7:
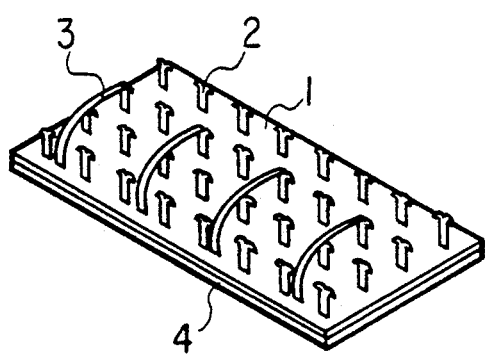
Figure 8:
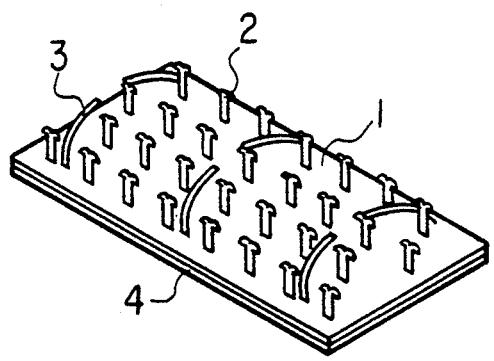
Figure 9:
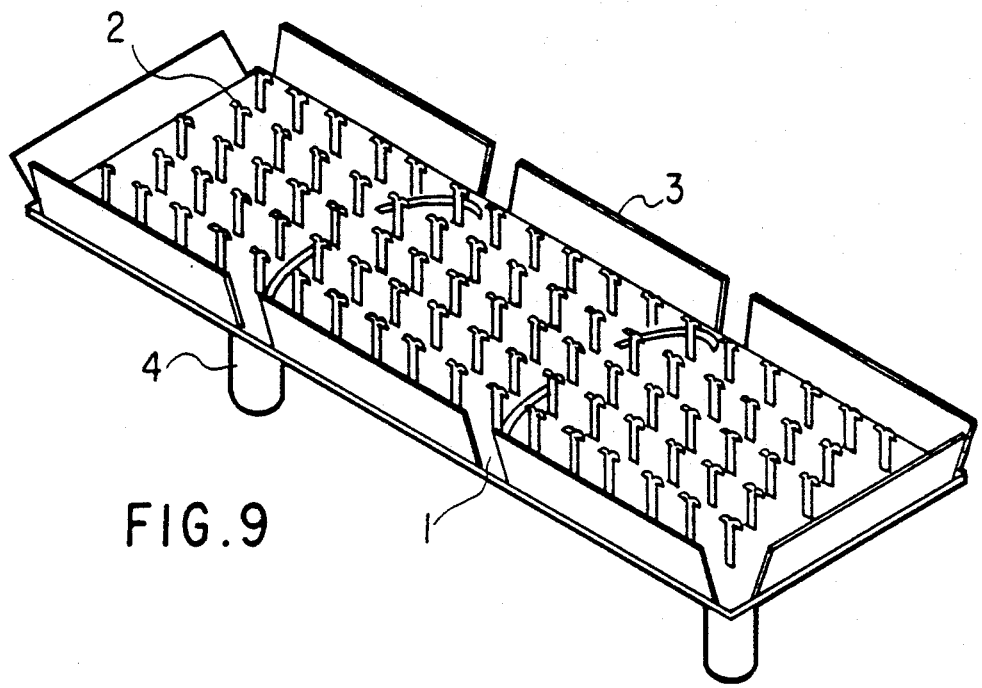

The protecting member 3 may, besides the above-mentioned side plates, be for example as shown in FIG. 7 or FIG. 8, arch-shaped or semi-arch-shaped strips or linear bodies provided near the sides of or on spaces inside the plate-shaped article. In the case where a large fastening device is used for a large adherend, it is preferred for the purpose of surely protecting the fastener component provided on the adherend from, during positioning, engaging with the other fastener component provided on the fastening device, that there be as shown in FIG. 9 provided, in addition to side plates near the sides of the plate-shaped article, a plurality of arch-shaped or semi-arch-shaped strips or linear bodies on the surface of the plate-shaped article in a spaced relationship with one another. Needless to say that a plurality of the fastening device of a small size with the side-plate type protecting members may be used for a large adherend.

The protecting member 3 comprising side plates and/or arch-shaped strips or linear bodies may integrally be formed with a plastic.

Figure 10:
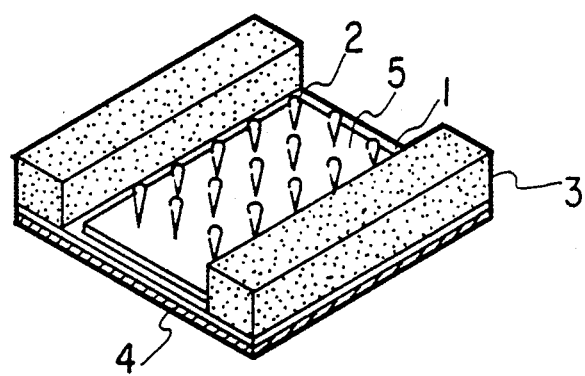

The protecting member 3 may be elastic articles such as sponge and foamed synthetic resin adhered, as shown in FIG. 10, to the vicinity of the sides of the plate-shaped article or to spaces on the surface the plate-shaped article.

Figure 4:
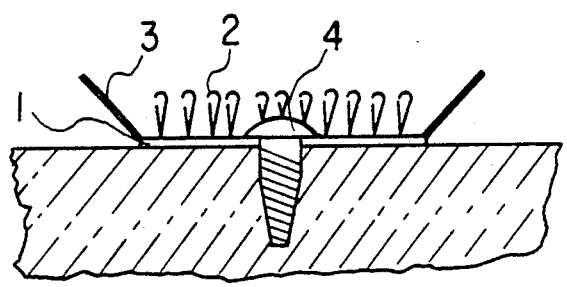
FIG. 4 is a cross-sectional view showing the fastening device shown in FIG. 3 being mounted on a base.

The fixing means 4 for fixing the fastening device on the surface of a base may suitably be selected depending on the structure and material of the base surface. For example for a base having a roughened surface, such as roof panel of an automobile, the fastening device is preferably fixed, as shown in FIG. 1 or FIG. 6, by a mounting hole provided on the panel. To this end, for example, a fixing means 4 comprising a cylinder-shaped fixing body having on the side wall thereof, generally a pair and in positions opposite to each other of, fixing pieces is provided on the back side of the plate-shaped article. For a larger fastening device, it is preferred that a plurality of fixing bodies be provided as shown in FIG. 9. The shape of such fixing body may also suitably be selected depending on the structure and material of the base. The fixing means may, as shown in FIGS. 5, 7, 8 and 10, be an adhesive applied to the back side of the plate-shaped article 1. Or, the fastening device may be fixed by using a fixing means comprising, as shown in FIG. 4, pegs, bolts and nuts, or the like.

The fastening device of the present invention may be constituted by mounting on a plate made of plastic, metal or the like, a fixing means 4 and a base fabric having one component of the loop and hook fastener or a shaped fastener component but, it is preferred from the viewpoint of economy to form by injection molding a plate-shaped article, a fixing means, a protecting member and one component of the loop and hook fastener integrally into the fastening device.

An example of the method for fixing an adherend on the surface of a base according to the present invention is now illustrated by reference to FIGS. 11 and 12. Firstly, the fastening device shown in FIG. 1 is applied to a base A and a fixing means 4 comprising a fixing body provided on the fastening device is inserted into a hole provided on the base A. Then, the fixing pieces on the side wall of the fixing body project outwardly to fix the fastening device on the surface of the base.

Figure 11:
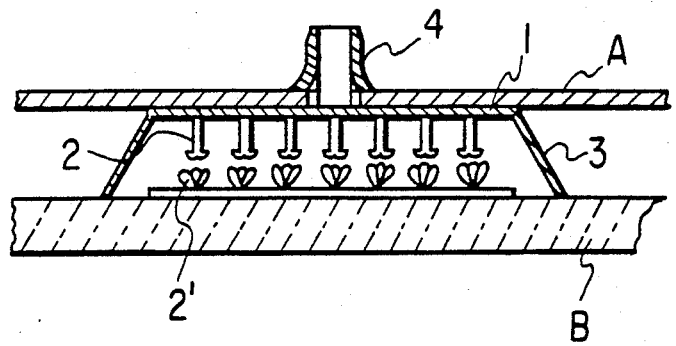
FIGS. 11 and 12 are cross-sectional views illustrating the method for fixing an adherend by using the fastening device of the present invention.

Next, an adherend B is applied to the base such that the fastener component 2' mounted on the adherend faces the fastener component 2 provided on the fastening device, and the adherend is then moved up and down and left and right to position it on a predetermined position (see FIG. 11). At the time of positioning the adherend B on the surface of the base, the fastener component on the adherend was kept apart from the fastener component on the base surface by action of the protecting member 3 provided on the fastening device and having a larger height than that of the fastener component provided on the fastening device, so that the two fastener components are protected from engaging with each other.

Figure 12:
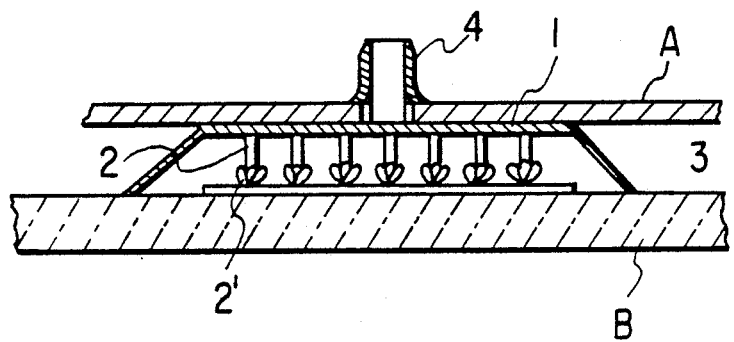

After the adherend has been set to a predetermined position on the surface of the base, the adherend B is pressed against the base A (FIG. 12). Then the protecting member 3 comprising side plates inclines outwardly so that the two fastener components 2 and 2' can be engaged with each other. Further pressing of the adherend will join the two fastener components more tightly. Needless to say that the above-mentioned fastener component 2' mounted on the adherend must be one which can engage with the fastener component 2 of the fastening device. As such fastener component for adherend, generally used are a multiplicity of loop-shaped elements. The loop-shaped fastening elements are provided on the surface of an adherend by applying by adhesion or fusion a woven, knit or nonwoven fabric having a multiplicity of loops, or a fluffy woven, knit or nonwoven fabric having a long hair. The strength, the density and the like of the loop-shaped elements are suitably selected such that a sufficient engaging force will be secured between the adherend and the fastener component of the fastening device. It is also possible to provide between the surface of the adherend and the loop-shaped fastener component a textile layer, a foam layer, a rubber layer or the like.

Figure 13:
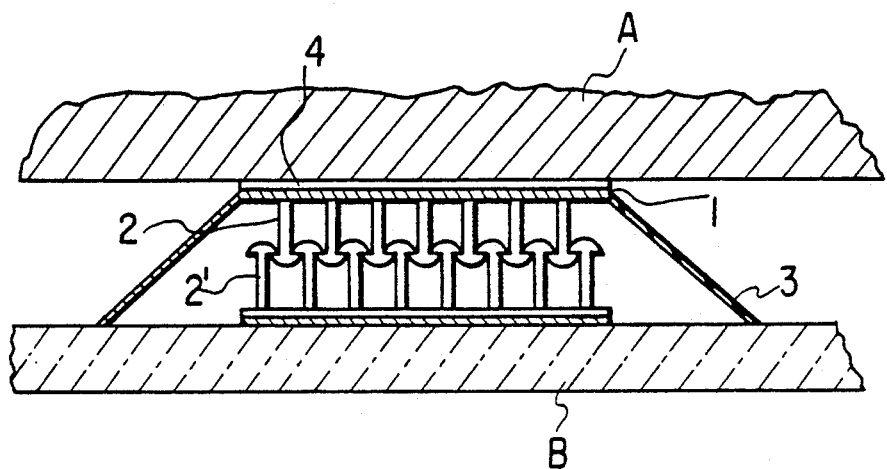
FIG. 13 is a cross-sectional view of another example of the fastening device of the present invention, utilizing one component of mushroom and mushroom type fastener, which fixes an adherend with the other mushroom shaped fastener component mounted thereon.

Any fastener component other than the above-mentioned loop-shaped fastener component may be provided on adherends as long as it engages with the hook-shaped fastener component provided on the fastening device. For example, FIG. 13 shows the case where a mushroom-shaped fastener component is used for the fastening device, and another mushroom-shaped fastener component with the same shape is used as the fastener component of an adherend.

The fastening device of the present invention can be used for fixing an adherend on a base either permanently or temporarily in anticipation of future replacement.

Obviously, numerous modifications and variations of the present invention are possible in light of the above teachings. It is therefore to be understood that within the scope of the appended claims, the invention may be practiced otherwise than as specifically described herein.

What is claimed is:

1. A fastening device for securely fixing an adherend mounted with one component of a loop and hook fastener on a predetermined position on the surface of a base, said device comprising:

a flat member having on one surface thereof interior to its peripheral edge the other component of the loop and hook fastener which will engage with the loop and hook fastener component mounted on the adherend;

a plurality of spacing members in the form of flat side plates for preventing the engagement of said two fastener components when said spacing members are in a generally vertical position and allowing the engagement of said two fastener components when said spacing members are in a substantially flat position, each said spacing member being connected by an edge to the peripheral edge of said one surface of the flat member having the other component of the loop and hook fastener and projecting upward from said one surface, said spacing members having a larger height than that of the loop and hook fastener component provided on the flat member so that it can, when the loop and hook fastener component mounted on the flat member is faced with the other loop and hook fastener component mounted on the adherend, keep the two fastener components in a spaced relationship with each other to prevent the engagement of said two fastener components and to allow the alignment of the adherend with respect to said predetermined position on the surface of the base, and being capable of, when the adherend is properly aligned with respect to said predetermined position and when the adherend is pressed against the flat member, deforming to said substantially flat position so that the two fastener components engage with each other; and a fixing means which fixes the flat member on the surface of the base.

2. A fastening device according to claim 1, wherein said fixing means is a fixing body provided on and projecting from the back side of the flat member.

3. A fastening device according to claim 1, wherein said fixing means is an adhesive applied to the back side of the flat member.

4. A fastening device according to claim 1, wherein said flat member, said spacing members and said fixing means have been integrally molded.

5. A method for securely fixing an adherend having one component of a loop and hook fastener on a predetermined position on the surface of a base, comprising the steps of:

(1) fixing on the surface of the base a fastening device comprising:
- a flat member having on one surface thereof interior to its peripheral edge the other component of the loop and hook fastener which will engage with the loop and hook fastener component mounted on the adherend,
- a plurality of generally vertical spacing members in the form of flat side plates with each spacing member connected by an edge to the peripheral edge of said one surface of the flat member having the other component of the loop and hook fastener, said spacing members having a larger height than that of the loop and hook fastener component provided on the flat member so that it can, when the loop and hook fastener component mounted on the flat member is faced with the other loop and hook fastener component mounted on the adherend, keep the two fastener components in a spaced relationship with each other to prevent the engagement of said two fastener components and to allow the alignment of the adherend with respect to said predetermined position on the surface of the base, and being capable of, when the adherend is properly aligned with respect to said predetermined position and when the adherend is pressed against the flat member, deforming to a substantially flat position so that the two fastener components engage with each other; and
- a fixing means for fixing the flat member to the surface of the base;

(2) applying the adherend having the one component of the loop and hook fastener to the surface of the base and positioning the adherend there; and (3) pressing the thus positioned adherend against the surface of the base so that the fastener component provided on the fastening device engages with the other fastener component mounted on the adherend.

* * * * *